July 30, 1963  YUKIO TANAKA  3,099,589
METHOD OF CEMENTATION IN WHICH FLUIDIZED CARBON
POWDER PARTICLES ARE EMPLOYED
Filed Jan. 4, 1960
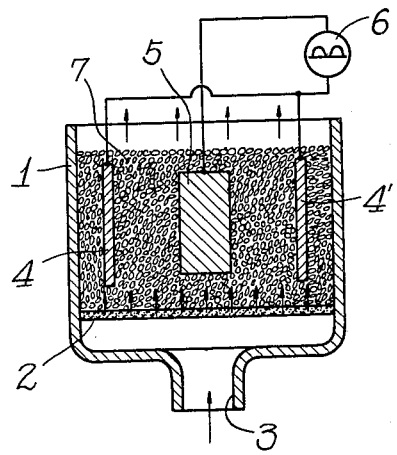
INVENTOR
Yukio Tanaka,
BY Pierce, Scheffler & Parker
his ATTORNEYS

United States Patent Office 3,099,589
Patented July 30, 1963

3,099,589
METHOD OF CEMENTATION IN WHICH FLUIDIZED CARBON POWDER PARTICLES ARE EMPLOYED
Yukio Tanaka, Tokyo, Japan, assignor to To-a Kako Kabushiki Kaisha, Tokyo, Japan, a corporation of Japan
Filed Jan. 4, 1960, Ser. No. 316
Claims priority, application Japan Sept. 15, 1959
3 Claims. (Cl. 148—20.3)

This invention relates to an improved method of cementation (i.e. meaning of carbon sintering).

Among the conventional methods of cementation employed to case-harden iron are a method wherein a solid cementing agent is employed, a method wherein a liquid cementing agent is employed and a method wherein a gaseous cementing agent is employed. However, in each of such methods, it is necessary to keep the product to be cemented and the cementing agent in contact with each other at such a high temperature for such a long time that there are defects that the velocity of cementation is low and that the operation of the cementing apparatus is troublesome.

A principal object of the present invention is to provide a method of cementation wherein the operation of cementing steel can be accomplished within a short time.

Another object of the present invention is to provide a method of cementation wherein, even if the shape of the piece to be cemented is irregular, a uniform cemented layer will be able to be formed.

A further object of the present invention is to provide a method of cementation wherein the cementing operation is easy.

Still another object of the present invention is to provide a method of cementation wherein the cost required to build the cementing apparatus is low.

According to the present invention, there is provided a method of cementation in which fluidized fine carbon powder particles are employed, characterized in that a metal piece to be cemented is dipped in a bed of fine carbon powder particles in a fluid state and a pulsating current is flowed from the bed of fine carbon powder particles to the metal piece to be cemented so that said bed of fine carbon powder particles may be of a positive potential toward the metal piece to be cemented.

The bed of fine carbon powder particles in a fluid state as in the above description can be obtained, for example, by a process wherein, when a bottom wall made of a material which passes gases but no fine carbon powder particles such as a porous tile is set in the middle of a chamber, fine carbon powder particles are contained above this bottom wall and a gas under pressure is forced in through an inlet made in the bottom of the chamber and upwardly through the gas-permeable wall, the fine carbon powder particles will be blown up by the gas so as to float. Such state is called fluidization herein. The preferable size of the carbon powder particle is 100 to 150 meshes per inch. The gas to be used to fluidize the fine carbon powder particles is such a gas as methane series hydrocarbon gas. The pressure of the gas is different depending on the capacity of the chamber and the thickness and porosity of the bottom wall but is preferably about 4 to 10 kg./cm.² The electric current to be used is a pulsating current i.e., an electric current which is flowed repeatedly, at regular intervals, in one direction.

The accompanying drawing illustrates an embodiment of the method of cementation wherein fluidized carbon powder particles are employed according to the present invention.

The present invention shall be explained with reference to drawing.

In the drawing, 1 is a fluidizing chamber and 2 is a porous bottom wall made of such porous material as, for example, a porous tile and provided as an intermediate bottom in the fluidizing chamber. The porous bottom wall is made of a material which passes gases but no fine carbon powder particles. 3 is a gas feeding inlet made in the bottom of the fluidizing chamber 1. 4 and 4' are electrodes arranged opposite each other within the fluidizing chamber. 5 is a metal piece to be cemented as inserted between the electrodes. 6 is an electric source for generating a pulsating current to be flowed through the electrodes 4 and 4' and the metal piece 5 to be cemented. 7 is a bed of fine carbon particles in a fluidized state within the fluidizing chamber. The pulsating current generating electric source is so oriented that the bed 7 of fine carbon powder particles in the fluid state may be of a positive potential toward the metal piece 5 to be cemented, that is to say, the electric source 6 is connected so that the electrodes 4 and 4' may be of a positive potential and the metal piece 5 to be cemented may be of a negative potential. A gas is fed in through the gas feeding inlet 3 in order that the bed of fine carbon powder particles may be in a fluid state.

The operation of the method of the present invention shall now be explained. When fine carbon powder particles are sprinkled on the porous bottom wall 2 within the fluidizing chamber 1 and a gas such as, for example, methane gas is fed in through the gas feeding inlet 3 made in the bottom of the fluidizing chamber, the gas will pass through the porous bottom wall 3 and will blow up the fine carbon particles so that the particles may be in a floating state. This is so-called fluidization. Thus, the electrodes 4 and 4' and the metal piece 5 to be cemented will remain dipped in the bed of the fluidized fine carbon powder particles. In such state, if a pulsating current voltage from the electric source 6 is impressed so that the electrodes 4 and 4' may be of a positive potential and the metal piece 5 to be cemented may be of a negative potential, a current will flow from the electrodes to the metal piece to be cemented, a spark discharge will be caused on the whole surface of the metal piece and the temperature of the surface of the metal piece will rise. Further, nascent carbon will be produced in the bordering layer between the bed of fine carbon powder particles and the surface of the metal piece by the spark discharge between them. This nascent carbon will be accelerated by the electric field produced by the electrodes 4 and 4' and the metal piece 5 to be cemented, will permeate the metal piece 5 and will form a cemented layer therein. For the electric current in the present invention there is used neither a direct current nor an alternating current but rather a pulsating voltage. The pulsating voltage is a voltage added repeatedly at regular time intervals in the same direction, as distinguished from direct current and alternating current. Its purpose is to enlarge the potential gradient between the fine carbon particles and the metal piece to be cemented and to make the generation of spark discharges easy that the pulsating voltage is used in the present invention.

According to experiments made by the present inventor, there were used a fluidizing chamber of internal dimensions of 160 mm. x 300 mm. x 150 mm., a porous tile about 30 mm. thick and carbon powder particles of about 100 to 150 meshes per inch. Methane gas was fed in under a pressure of about 4 kg./cm.² through the gas feeding inlet made in the bottom of the fluidizing chamber. The size of each electrode was 200 mm. x 150 mm. x 2 mm. The distance between the electrodes was 100 mm. A soft steel piece 90 mm. in diameter and 100 mm. long was inserted between said electrodes. When an electric source generating a pulsating current of a peak value of 0.5 kv. at 100 cycles was used for the electrodes, an electric current having of 0.9 amp./cm.$^2$ at mean value passed through the soft steel piece. As a result, a cement layer 0.9 mm. thick could be formed in the soft steel piece in two hours.

According to the present invention, as described above, carbon particles are fluidized and a pulsating current is made to flow between the fluidized carbon particles and the metal piece to be cemented, so that three-dimensionally expanding spark discharges may be generated on the surface of the metal piece and a cemented layer may be uniformly formed on all the surfaces of the metal piece, the cementing velocity being very high.

What is claimed is:

1. A method of cementation in which fluidized carbon powder particles are employed according to claim 3, wherein the fluidization of the carbon particles is effected by means of a gaseous hydrocarbon of the methane series.

2. A method of cementation in which fluidized carbon powder particles are employed according to claim 1 wherein said methane series hydrocarbon gas is methane gas.

3. A method of cementation which comprises establishing and maintaining a fluidized bed of finely divided carbon particles by means of a fluidizing gas consisting essentially of a gaseous saturated aliphatic hydrocarbon, in a fluidizing chamber having a micro-porous bottom wall, immersing in said fluidized bed a metal piece to be cemented between electrodes likewise immersed in said fluidized bed passing a pulsating current from said electrodes through the carbon particles to said metal piece to be cemented under conditions such that the carbon particles are at a positive potential while the metal piece is at a negative potential, whereby spark discharges generated on the surface of the metal piece produce nascent carbon and the metal piece is cemented by said nascent carbon.

References Cited in the file of this patent

UNITED STATES PATENTS

| | | |
|---|---|---|
| 799,542 | Davis | Sept. 12, 1905 |
| 876,862 | Davis | Jan. 14, 1908 |
| 1,408,686 | Bertschy | Mar. 7, 1922 |
| 2,670,573 | Sullivan | Mar. 2, 1954 |
| 2,927,231 | Bucek | Mar. 1, 1960 |
| 3,053,704 | Munday | Sept. 11, 1962 |

FOREIGN PATENTS

| | | |
|---|---|---|
| 732,101 | Great Britain | June 22, 1955 |

OTHER REFERENCES

Physical Review, vol. 55, April 15, 1939, pages 769–775.